(12) United States Patent
Woo et al.

(10) Patent No.: US 11,411,226 B2
(45) Date of Patent: Aug. 9, 2022

(54) ELECTRODE FOR FUEL CELLS, MEMBRANE ELECTRODE ASSEMBLY FOR FUEL CELLS INCLUDING THE SAME, AND METHOD FOR MANUFACTURING THE SAME

(71) Applicants: HYUNDAI MOTOR COMPANY, Seoul (KR); KIA MOTORS CORPORATION, Seoul (KR)

(72) Inventors: Hee Jin Woo, Suwon-si (KR); Jun Woo Kim, Hwaseong-si (KR); Jun Tae Kim, Yongin-si (KR); Ji Seok Hwang, Yongin-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 17/078,407

(22) Filed: Oct. 23, 2020

(65) Prior Publication Data
US 2021/0151777 A1    May 20, 2021

(30) Foreign Application Priority Data
Nov. 14, 2019    (KR) .................. 10-2019-0145508

(51) Int. Cl.
*H01M 4/92* (2006.01)
*H01M 4/86* (2006.01)
(Continued)

(52) U.S. Cl.
CPC .......... *H01M 4/926* (2013.01); *H01M 4/8657* (2013.01); *H01M 4/8828* (2013.01);
(Continued)

(58) Field of Classification Search
CPC ....................................................... H01M 4/926
See application file for complete search history.

(56) References Cited

U.S. PATENT DOCUMENTS

| | | | | |
|---|---|---|---|---|
| 5,882,810 A * | 3/1999 | Mussell | ............... | H01M 4/8642 |
| | | | | 204/296 |
| 2005/0164072 A1* | 7/2005 | Yan | ..................... | H01M 4/8605 |
| | | | | 502/101 |

(Continued)

FOREIGN PATENT DOCUMENTS

| | | |
|---|---|---|
| JP | 2007-048471 A | 2/2007 |
| KR | 10-0953613 B1 | 4/2010 |

(Continued)

*Primary Examiner* — Brian R Ohara
(74) *Attorney, Agent, or Firm* — McDonnell Boehnen Hulbert & Berghoff LLP

(57) ABSTRACT

Disclosed are an electrode for fuel cells, a membrane electrode assembly for fuel cells including the same and a method for manufacturing the same in which the electrode is manufactured by forming an ionomer layer between an electrode layer and a catalyst layer and an antioxidant is dispersed into the catalyst layer of the electrode and an ion exchange layer of an electrolyte membrane so as to improve interfacial bonding force between the electrode and the electrolyte membrane, the electrode is bonded to the electrolyte membrane using a transfer process, and durability of the electrode and the electrolyte membrane is improved.

12 Claims, 9 Drawing Sheets

131   ⬡ 132   ○ 133   ▨ 134   ▨ 135

(51) Int. Cl.
*H01M 4/88* (2006.01)
*H01M 8/1004* (2016.01)
*H01M 8/1039* (2016.01)

(52) U.S. Cl.
CPC ....... *H01M 4/8892* (2013.01); *H01M 8/1004* (2013.01); *H01M 8/1039* (2013.01)

(56) References Cited

U.S. PATENT DOCUMENTS

2011/0027696 A1* 2/2011 Fay .................... H01M 8/0258
429/525
2011/0129759 A1* 6/2011 Hwang ............... H01M 4/8605
429/535

FOREIGN PATENT DOCUMENTS

| KR | 2010-0107012 A | 10/2010 |
| KR | 10-1531075 B1 | 6/2015 |
| KR | 10-1669236 B1 | 10/2016 |

* cited by examiner

ELECTRODE FOR FUEL CELLS, MEMBRANE ELECTRODE ASSEMBLY FOR FUEL CELLS INCLUDING THE SAME, AND METHOD FOR MANUFACTURING THE SAME

CROSS REFERENCE TO RELATED APPLICATIONS

This application claims under 35 U.S.C. § 119(a) the benefit of priority to Korean Patent Application No. 10-2019-0145508 filed on Nov. 14, 2019, the entire contents of which are incorporated herein by reference.

BACKGROUND

(a) Technical Field

The present disclosure relates to an electrode for fuel cells, a membrane electrode assembly for fuel cells including the same and a method for manufacturing the same in which interfacial bonding force between the electrode and an electrolyte membrane is improved, bonding of the electrode to the electrolyte membrane using a transfer process is possible, and durability of the electrode and the electrolyte membrane is improved.

(b) Background Art

Fuel cells are electrochemical devices which produce electricity through chemical reaction between hydrogen and oxygen serving as reactants. There among, a polymer electrolyte membrane fuel cell which uses a proton permeable polymer membrane as an electrolyte is a high power fuel cell which has a high current density as compared to other fuel cells. The polymer electrolyte membrane fuel cell includes several elements, i.e., a membrane electrode assembly (MEA) in which electrochemical reaction occurs, gas diffusion layers (GDLs) corresponding to porous media which uniformly diffuse reaction gas to the surfaces of the MEA, and bipolar plates which support the MEA and the GDLs, transport the reaction gases and cooling water, collect generated electricity and transmit the electricity. Several tens or hundreds of these elements are stacked, thus forming a fuel cell stack.

Particularly, the membrane electrode assembly is manufactured by preparing electrode units, each of which is prepared by forming a catalyst layer on an electrode layer, and then transferring a cathode unit and an anode unit to both surfaces of an electrolyte membrane. The electrolyte membrane of the membrane electrode assembly serves to conduct protons using an ion exchange material. Through the ion exchange material of the electrolyte membrane, oxygen ions of the cathode move to the anode and protons of the anode move to the cathode. However, hydrogen and oxygen meet at the interface between the electrolyte membrane and the cathode, and thus produce hydrogen peroxide ($H_2O_2$). Hydrogen peroxide is decomposed into hydroxyl radicals, hydroperoxyl radicals, etc., thus degrading the electrolyte membrane.

In order to solve such a drawback, a polymer electrolyte membrane formed by adding a catalyst and an antioxidant to an electrolyte membrane so as to prevent generation of radicals at the interface between the electrolyte membrane and a cathode has been conventionally proposed. However, when degradation of the electrolyte membrane due to radicals caused by hydrogen peroxide is started, the catalyst included in the electrolyte membrane may accelerate such chemical degradation. Further, the radicals are not effectively removed due to degradation of the electrolyte membrane by the catalyst, and thus, the above polymer electrolyte membrane does not greatly contribute to improvement in durability.

In addition, a large amount of the antioxidant is included in the electrolyte membrane, and thus, it is difficult to bond electrodes to the electrolyte membrane using a transfer process. The reason for this is that the large amount of the antioxidant included in an ionomer layer reduces the distribution of the ionomer and contact with the electrodes is relatively decreased. Consequently, the electrodes are not properly transferred onto the ionomer layer, and thus, a bonding fault occurs.

SUMMARY

The present disclosure has been made in an effort to solve the above-described problems associated with the prior art and it is an object of the present disclosure to provide an electrode for fuel cells in which an ionomer layer is formed between an electrode layer and a catalyst layer so as to improve durability of the electrode.

It is another object of the present disclosure to provide a membrane electrode assembly for fuel cells including an electrode in which interfacial bonding force between the electrode and an electrolyte membrane is improved.

It is a further object of the present disclosure to provide a method for manufacturing a membrane electrode assembly for fuel cells in which bonding of electrodes to an electrolyte membrane using a transfer process is possible.

In one aspect, the present disclosure provides an electrode for fuel cells including an electrode layer and a protective layer formed at one side of the electrode layer, wherein the electrode layer includes a catalyst support in which a metal catalyst is supported on a carbon support, an antioxidant and an ionomer, wherein the protective layer includes an ionomer layer provided with one side contacting the electrode layer and including another ionomer, and a catalyst layer formed at the other side of the ionomer layer and including the catalyst support in which the metal catalyst is supported on the carbon support, the antioxidant and the ionomer.

In a preferred embodiment, the ionomer in the protective layer may include a polymer including at least one sulfonated aromatic compound selected from the group consisting of perfluorosulfonic acid (PFSA), phenolsulfonic acid, polystyrene sulfonic acid, fluorinated styrene sulfonic acid and combinations thereof.

In another preferred embodiment, the metal catalyst may include one selected from the group consisting of platinum, gold, palladium, iridium, rhodium, ruthenium and combinations thereof.

In still another preferred embodiment, the carbon support may include one selected from the group consisting of acetylene black, carbon black, porous carbon, carbon nanoparticles, carbon nanotubes, carbon nanofibers, graphene, graphite carbon and combinations thereof.

In yet another preferred embodiment, the ionomer layer may include the ionomer alone.

In still yet another preferred embodiment, a content of the catalyst support in the catalyst layer may be less than a content of the catalyst support in the electrode layer, and a content of the antioxidant in the catalyst layer may be greater than a content of the antioxidant in the electrode layer.

In a further preferred embodiment, the electrode layer may include 1-70 wt % of the catalyst support, 0.1-20 wt % of the antioxidant, and 10-98 wt % of the ionomer.

In another further preferred embodiment, the catalyst layer may include 0.1-30 wt % of the catalyst support, 0.01-20 wt % of the antioxidant, and 50-99 wt % of the ionomer.

In another aspect, the present disclosure provides a membrane electrode assembly for fuel cells including an electrolyte membrane and a pair of electrodes provided on both surfaces of the electrolyte membrane, wherein the electrodes include a cathode and an anode, wherein at least one of the cathode or the anode is the above-described electrode for fuel cells, and the cathode and the anode are stacked on the electrolyte membrane such that protective layers of the cathode and the anode face the electrolyte membrane.

In a preferred embodiment, the electrolyte membrane may include a porous reinforcing layer, a first ion exchange layer provided on one surface of the reinforcing layer, and a second ion exchange layer provided on the other surface of the reinforcing layer.

In another preferred embodiment, the membrane electrode assembly for fuel cells may further include a first sub-gasket configured to contact one surface of the electrolyte membrane and to contact side surfaces of the cathode, and a second sub-gasket configured to contact the other surface of the electrolyte membrane and to contact side surfaces of the anode.

In still another preferred embodiment, the membrane electrode assembly for fuel cells may further include a first gas diffusion layer configured to contact the first sub-gasket and the cathode, and a second gas diffusion layer configured to contact the second sub-gasket and the anode.

In still another aspect, the present disclosure provides a method for manufacturing a membrane electrode assembly, the method including forming electrode layers by coating release papers with an electrode slurry including a catalyst support, in which a metal catalyst is supported on a carbon support, an antioxidant and an ionomer, forming ionomer layers by coating the electrode layers with another ionomer, manufacturing electrodes provided with catalyst layers by coating the ionomer layers with a catalyst slurry including the catalyst support, in which the metal catalyst is supported on the carbon support, the antioxidant and the ionomer, transferring the electrodes to an electrolyte membrane so that the catalyst layers of the electrodes come into contact with the electrolyte membrane, bonding sub-gaskets to side surfaces of the transferred electrodes, and removing the release papers from the transferred electrodes and forming gas diffusion layers on the sub-gaskets and the electrodes.

In a preferred embodiment, in the transferring the electrodes to the electrolyte membrane so that the catalyst layers of the electrodes come into contact with the electrolyte membrane, the electrodes may be transferred to the electrolyte membrane at a temperature of 50-250° C. and a pressure of 50-500 kgf.

Other aspects and preferred embodiments of the disclosure are discussed infra.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
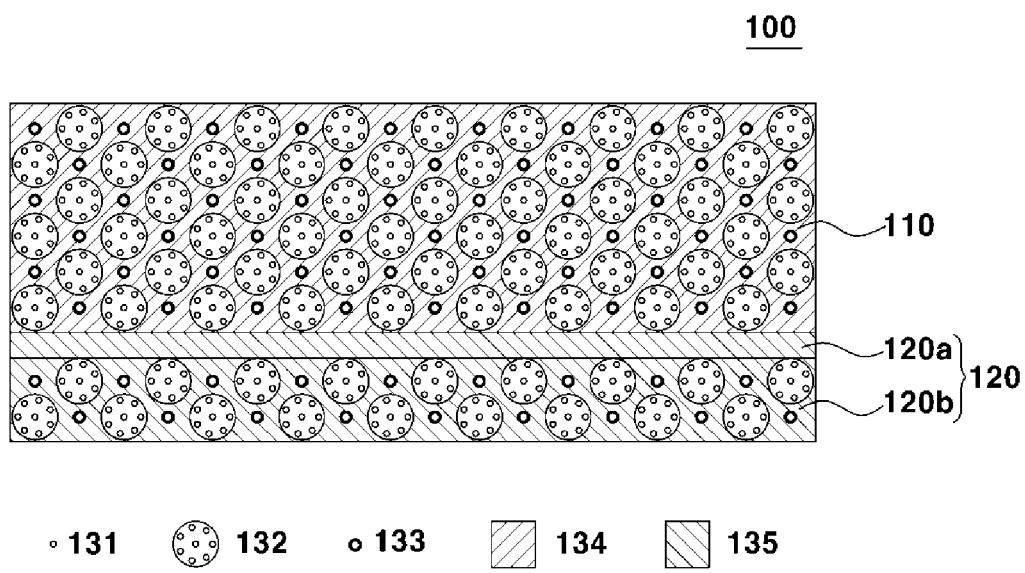
FIG. 1 is a cross-sectional view of an electrode for fuel cells in accordance with the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawings.

DETAILED DESCRIPTION

Hereinafter reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments within the spirit and scope of the disclosure as defined by the appended claims.

In the following description of the embodiments, the same elements are denoted by the same reference numerals even though they are depicted in different drawings. In the drawings, dimensions of structures are exaggerated as compared to actual dimensions thereof, for clarity of description. In the following description of the embodiments, terms, such as "first", "second", etc., may be used to describe various elements but do not limit the elements. These terms are used only to distinguish one element from other elements. For example, a first element may be named a second element and similarly the second element may be named the first element, within the spirit and scope of the disclosure. Singular expressions may encompass plural expressions, unless they have clearly different contextual meanings.

In the following description of the embodiments, terms, such as "including", "having", etc., will be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

All numbers, values and/or expressions representing amounts of components, reaction conditions, polymer compositions and blends used in the description are approximations in which various uncertainties in measurement generated when these values are acquired from essentially different things are reflected and thus, it will be understood that they are modified by the term "about", unless stated otherwise. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

Hereinafter, the present disclosure will be described in more detail.

The present disclosure relates to an electrode 100 for fuel cells, a membrane electrode assembly 200 for fuel cells including the same, and a method for manufacturing the membrane electrode assembly 200 for fuel cells. More particularly, the electrode 100 for fuel cells in accordance with the present disclosure includes an electrode layer 110 and a protective layer 120 formed at one side of the electrode layer 110, the electrode layer 110 includes a catalyst support 132 in which a metal catalyst 131 is supported on a carbon support, an antioxidant 133 and an ionomer 134, and the protective layer 120 includes an ionomer layer 120a provided with one side contacting the electrode layer 110 and including an ionomer 135, and a catalyst layer 120b formed at the other side of the ionomer layer 120a and including the catalyst support 132 in which the metal catalyst 131 is supported on the carbon support, the antioxidant 133 and the ionomer 135.

FIG. 1 is a cross-sectional view of the electrode 100 for fuel cells in accordance with the present disclosure. Referring to FIG. 1, the electrode 100 for fuel cells includes the electrode layer 110 and the protective layer 120 formed on the electrode layer 110.

The electrode layer 110 may include the catalyst support 132 in which the metal catalyst 131 is supported on the carbon support, the antioxidant 133 and the ionomer 134.

The metal catalyst 131 may include one selected from the group consisting of platinum, gold, palladium, iridium, rhodium, ruthenium and combinations thereof.

The carbon support may include one selected from the group consisting of acetylene black, carbon black, porous carbon, carbon nanoparticles, carbon nanotubes, carbon nanofibers, graphene, graphite carbon and combinations thereof.

The protective layer 120 includes the ionomer layer 120a contacting the electrode layer 110, and the catalyst layer 120b formed on the ionomer layer 120a. The ionomer layer 120a structurally separates the electrode layer 110 and the catalyst layer 120b from each other, and may thus electrically completely isolate the catalyst layer 120b. Thereby, production of hydrogen peroxide in the catalyst layer 120b may be suppressed. The ionomer layer 120a may include the ionomer 135 alone. Here, the ionomer 135 may include a polymer including at least one sulfonated aromatic compound selected from the group consisting of perfluorosulfonic acid (PFSA), phenolsulfonic acid, polystyrene sulfonic acid, fluorinated styrene sulfonic acid and combinations thereof.

The catalyst layer 120b may include the catalyst support 132 in which the metal catalyst 131 is supported on the carbon support, the antioxidant 133 and the ionomer 135. The catalyst layer 120b removes hydrogen peroxide generated from the interface between an electrolyte membrane and a cathode, and may thus protect the ionomer layer 120a and improve durability of the electrode 100. Hydrogen peroxide may produce water ($H_2O$) through chemical bonding to the catalyst support 132, and water may be effectively discharged through the ionomer layer 120a and the electrolyte membrane. Further, the antioxidant 133 may be chemically combined with radicals generated from hydrogen peroxide, and thus remove the radicals. The antioxidant 133 may be one selected from the group consisting of cerium oxide, cerium zirconium oxide, cerium sulfate, manganese sulfate, manganese oxide and combinations thereof.

The content of the catalyst support 132 in the catalyst layer 120b may be less than the content of the catalyst support 132 in the electrode layer 110, and the content of the antioxidant 133 in the catalyst layer 120b may be greater than the content of the antioxidant 133 in the electrode layer 110. Here, the content is not an absolute value, but may be expressed as wt % based on the total weight of each layer. Specifically, when the content of the catalyst support 132 in the catalyst layer 120b is greater than the content of the catalyst support 132 in the electrode layer 110, main chemical reaction caused by catalytic activity occurs in the catalyst layer 120b and thus efficiency of the electrode layer 110 may be reduced, and membrane degradation due to radicals generated from hydrogen peroxide by side reaction in the catalyst layer 120b adjacent to the electrolyte membrane may be accelerated. Further, when the content of the antioxidant 133 in the catalyst layer 120b is less than the content of the antioxidant 133 in the electrode layer 110, efficiency of the antioxidant 133 may be reduced.

Specifically, the electrode layer 110 may include 1-70 wt % of the catalyst support 132, 0.1-20 wt % of the antioxidant 133, and 10-98 wt % of the ionomer 134.

The catalyst layer 120b may include 0.1-30 wt % of the catalyst support 132, 0.01-20 wt % of the antioxidant 133, and 50-99 wt % of the ionomer 135. Here, when the content of the catalyst support 132 is less than 0.1 wt %, reaction with crossover hydrogen gas permeating from the anode to the cathode is reduced, and thus, efficiency in decomposition of hydrogen peroxide may be reduced. On the other hand, when the content of the catalyst support 132 exceeds 30 wt %, an ion transmission rate in the membrane may be reduced and electrically insulating effect may be reduced. Further, when the content of the antioxidant 133 is less than 0.01 wt %, the radicals generated by hydrogen peroxide may not be effectively removed. On the other hand, when the content of the antioxidant 133 exceeds 20 wt %, ion conductivity may be reduced.

Figure 3:
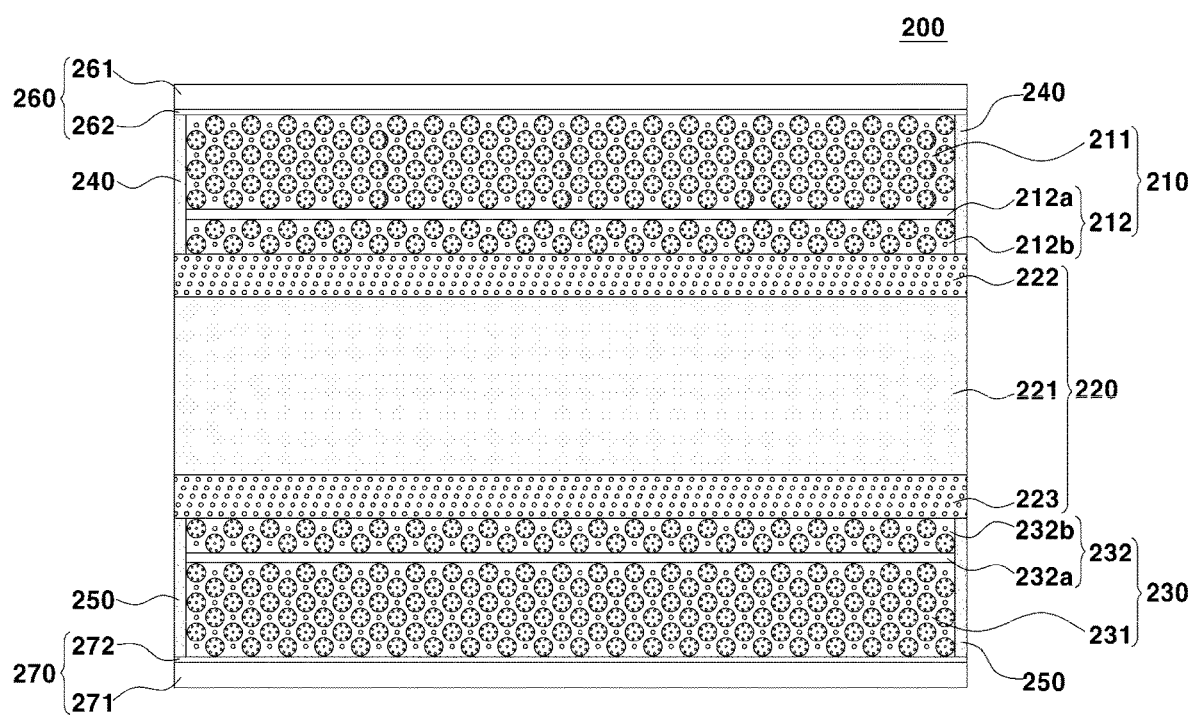
FIG. 3 is a cross-sectional view of a membrane electrode assembly for fuel cells manufactured in an example of the present disclosure.

Further, as shown in FIG. 3, the present disclosure provides the membrane electrode assembly 200 for fuel cells including an electrolyte membrane 220 and a pair of electrodes 100 provided on both surfaces of the electrolyte membrane 220, the electrodes 100 including a cathode 210 and an anode 230, at least one of the cathode 210 or the anode 230 is the above-described electrode 100, and the cathode 210 and the anode 230 are stacked on the electrolyte membrane 220 such that protective layers of the cathode 210 and the anode 230 face the electrolyte membrane 220.

The electrolyte membrane 220 may include a porous reinforcing layer 221, a first ion exchange layer 222 provided on one surface of the reinforcing layer 221, and a second ion exchange layer 223 provided on the other surface of the reinforcing layer 221.

The first ion exchange layer 222 and the second ion exchange layer 223 may include an ion exchange material. The ion exchange material may include a polymer including at least one sulfonated aromatic compound selected from the group consisting of perfluorosulfonic acid (PFSA), phenolsulfonic acid, polystyrene sulfonic acid, fluorinated styrene sulfonic acid and combinations thereof. The ion exchange material may contain moisture and selectively move protons generated at the anode 230 to the cathode 210.

The reinforcing layer 221 may be interposed between the first ion exchange layer 222 and the second exchange layer 223 so as to increase mechanical stiffness. The reinforcing layer 221 may be formed of an expanded-polytetrafluoroethylene (e-PTFE), and be a porous membrane having a great number of pores. The reinforcing layer 211 may be a layer which is impregnated with the ion exchange material.

The membrane electrode assembly 200 may further include a first sub-gasket 240 which contacts one surface of the electrolyte membrane 220 and contacts the side surfaces of the cathode 210, and a second sub-gasket 250 which contacts the other surface of the electrolyte membrane 220 and contacts the side surfaces of the anode 230.

The membrane electrode assembly 200 may further include a first gas diffusion layer 260 which contacts the first sub-gasket 240 and the cathode 210, and a second gas diffusion layer 270 which contacts the second sub-gasket 250 and the anode 230. The first gas diffusion layer 260 and the second gas diffusion layer 270 may respectively include carbon layers 262 and 272 including porous carbon, and carbon fiber layers 261 and 271 formed on the carbon layers 262 and 272 and including porous carbon fibers.

In addition, the present disclosure provides a method for manufacturing a membrane electrode assembly 200 for fuel cells, including forming electrode layers 211 and 231 by coating release papers 280 with an electrode slurry including a catalyst support 132 in which a metal catalyst 131 is supported on a carbon support, an antioxidant 133 and an ionomer 134, forming ionomer layers 212a and 232a by coating the electrode layers 211 and 231 with an ionomer 135, manufacturing electrodes provided with catalyst layers 212a and 232b by coating the ionomer layers 212a and 232a with a catalyst slurry including the catalyst support 132 in which the metal catalyst 131 is supported on the carbon support, the antioxidant 133 and the ionomer 135, transferring the electrodes to an electrolyte membrane 220 so that the catalyst layers 212b and 213b of the electrodes come into contact with the electrolyte membrane 220, bonding sub-gaskets 240 and 250 to the side surfaces of the transferred electrodes, and removing the release papers 280 from the transferred electrodes and forming gas diffusion layers 260 and 270 on the sub-gaskets 240 an 250 and the electrodes.

Figure 2:
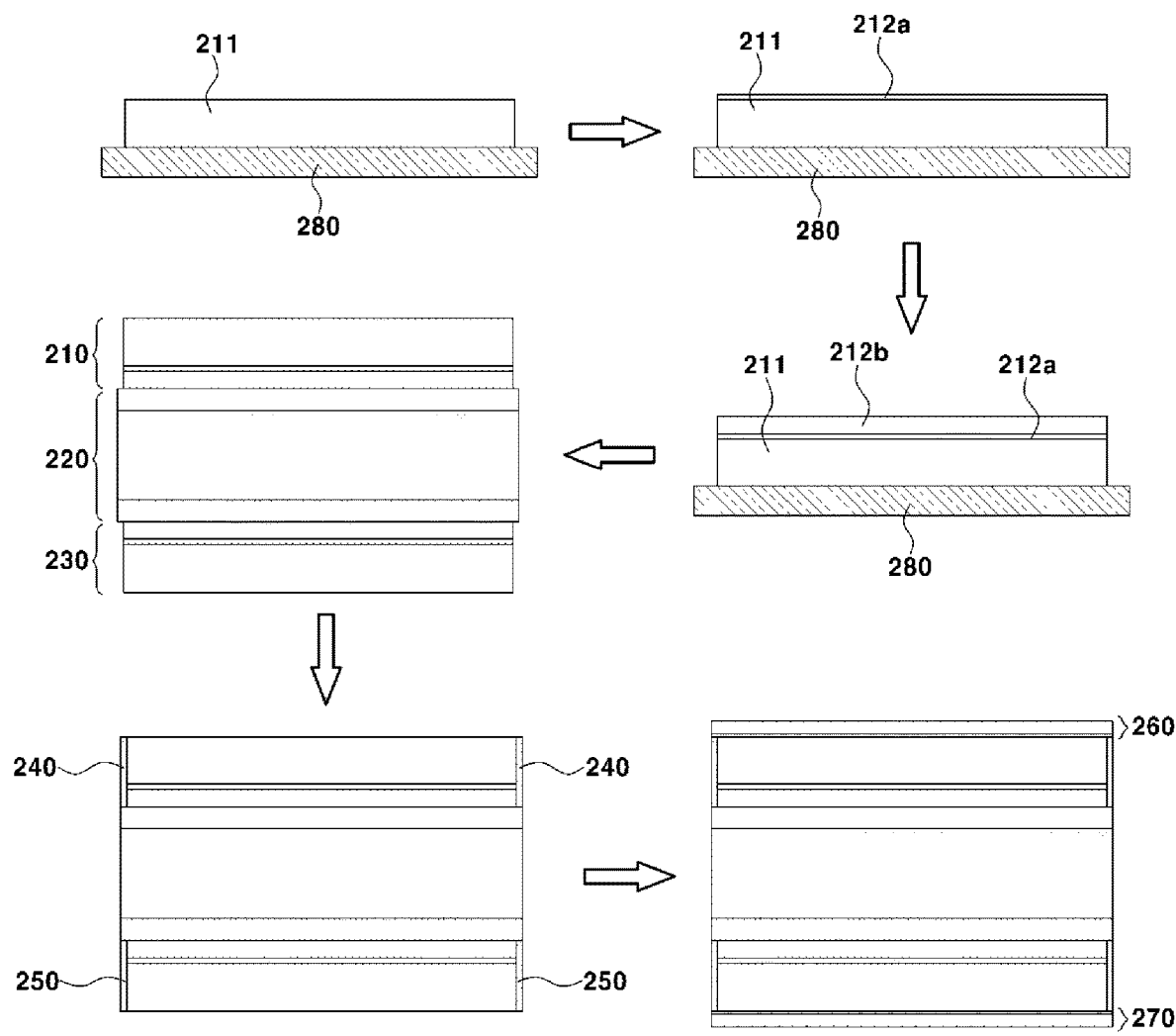
FIG. 2 is a view schematically illustrating a method for manufacturing a membrane electrode assembly for fuel cells in accordance with the present disclosure.

FIG. 2 is a view schematically illustrating the above-described method for manufacturing the membrane electrode assembly 200 for fuel cells. Referring to FIG. 2, first, the electrode layers 211 and 231 are formed by coating the release papers 280 with the electrode slurry and then drying the release papers 280 coated with the electrode slurry. Thereafter, the ionomer layers 212a and 232a are formed by thinly coating the electrode layers 211 and 231 with an ionomer solution and then drying the electrode layers 212 and 231 coated with the ionomer solution. The catalyst layers 212b and 232b are formed by coating the dried ionomer layers 212a and 232a with the catalyst slurry and then drying the ionomer layers 212a and 232a coated with the catalyst slurry. The electrodes are bonded to the electrolyte membrane 220 by transferring the electrode layers 211 and 231 and the protective layers 212 and 232 including the ionomer layers 212a and 232a and the catalyst layers 212b and 232b onto both surfaces of the electrolyte membrane 220. Here, the electrode bonded to the upper surface of the electrolyte membrane 220 serves as a cathode 210, and the electrode bonded to the lower surface of the electrode membrane 220 serves as an anode 230. Thereafter, in order to seal the side surfaces of the cathode 210 and the exposed electrolyte membrane 220, the first sub-gasket 240 is adhered and fixed thereto. In order to seal the side surfaces of the anode 230 and the exposed electrolyte membrane 220, the second sub-gasket 250 is adhered and fixed thereto. Thereafter, the first gas diffusion layer 260 and the second gas diffusion layer 270 are respectively formed on the first and second sub-gaskets 240 and 250 and the electrodes, i.e., the cathode 210 and the anode 230, thereby manufacturing the membrane electrode assembly 200.

The content of the catalyst support 132 in the catalyst layers 212b and 232b may be less than the content of the catalyst support 132 in the electrode layers 211 and 231, and the content of the antioxidant 133 in the catalyst layers 212b and 232b may be greater than the content of the antioxidant 133 in the electrode layers 211 and 231. More particularly, the electrode layers 211 and 231 may include 1-70 wt % of the catalyst support 132, 0.1-20 wt % of the antioxidant 133, and 10-98 wt % of the ionomer 134. Further, the catalyst layers 212b and 232b may include 0.1-30 wt % of the catalyst support 132, 0.01-20 wt % of the antioxidant 133, and 50-99 wt % of the ionomer 135.

In transfer of the electrodes to the electrolyte membrane 220 so that the catalyst layers 212b and 213b of the electrodes come into contact with the electrolyte membrane 220, the electrodes may be transferred to the electrolyte membrane 220 at a temperature of 50-250° C. and a pressure of 50-500 kgf. Here, when the transfer temperature is less than 50° C., a bonding rate of the interfaces between the catalyst layers 212b and 232b and the electrolyte membrane 220 may be lowered. On the other hand, when the transfer temperature exceeds 250° C., destruction of the release papers 280, over-transfer, etc. may be caused. Particularly, the transfer temperature may be 80-170° C.

The method for manufacturing the membrane electrode assembly 200 for fuel cells may further include performing heat treatment by applying heat and pressure after transfer of the electrodes to the electrolyte membrane 220 so that the catalyst layers 212b and 213b of the electrodes come into contact with the electrolyte membrane 220.

As such, the electrode 100 for fuel cells in accordance with the present disclosure includes the ionomer layer 212a or 232a which is structurally independent, between the electrode layer 211 or 231 and the catalyst layer 212b or 232b, thereby electrically isolating the catalyst layer 212b or 232b and thus being capable of suppressing production of hydrogen peroxide in the catalyst layer 212b or 232b. Further, the electrode 100 for fuel cells allows the catalyst layer 212b or 232b to include the antioxidant 133, and thereby, the antioxidant 133 is chemically combined with radicals generated from hydrogen peroxide so as to remove the radicals, thus improving durability of the electrode 100 for fuel cells.

Further, the membrane electrode assembly 200 for fuel cells in accordance with the present disclosure disperses some of the catalyst support 132 and the antioxidant 133, which were included in an ion exchange layer of a conventional electrolyte membrane, into the catalyst layers 212b and 232b of the electrodes, thereby improving interfacial bonding force between the electrodes and the electrolyte membrane 220 and simultaneously improving durability of the electrolyte membrane 220. In addition, the method for manufacturing the membrane electrode assembly 200 for fuel cells in accordance with the present disclosure improves interfacial bonding force between the electrodes and the electrolyte membrane 220, thus facilitating bonding of the electrodes to the electrolyte membrane 220 using the transfer process.

Hereinafter, the present disclosure will be described in more detail through the following examples. However, the examples illustrate the disclosure and are not intended to limit the scope of the disclosure.

EXAMPLE

A membrane electrode assembly 200 was implemented using a conventional method, and was manufactured through operations shown in FIG. 2. Referring to FIG. 2, the membrane electrode assembly 200 was manufactured by transferring a cathode 210 and an anode 230 to both surfaces of an electrolyte membrane 220 at a temperature of 110° C. and a pressure of 80 kgf using a hot press.

Figure 4:
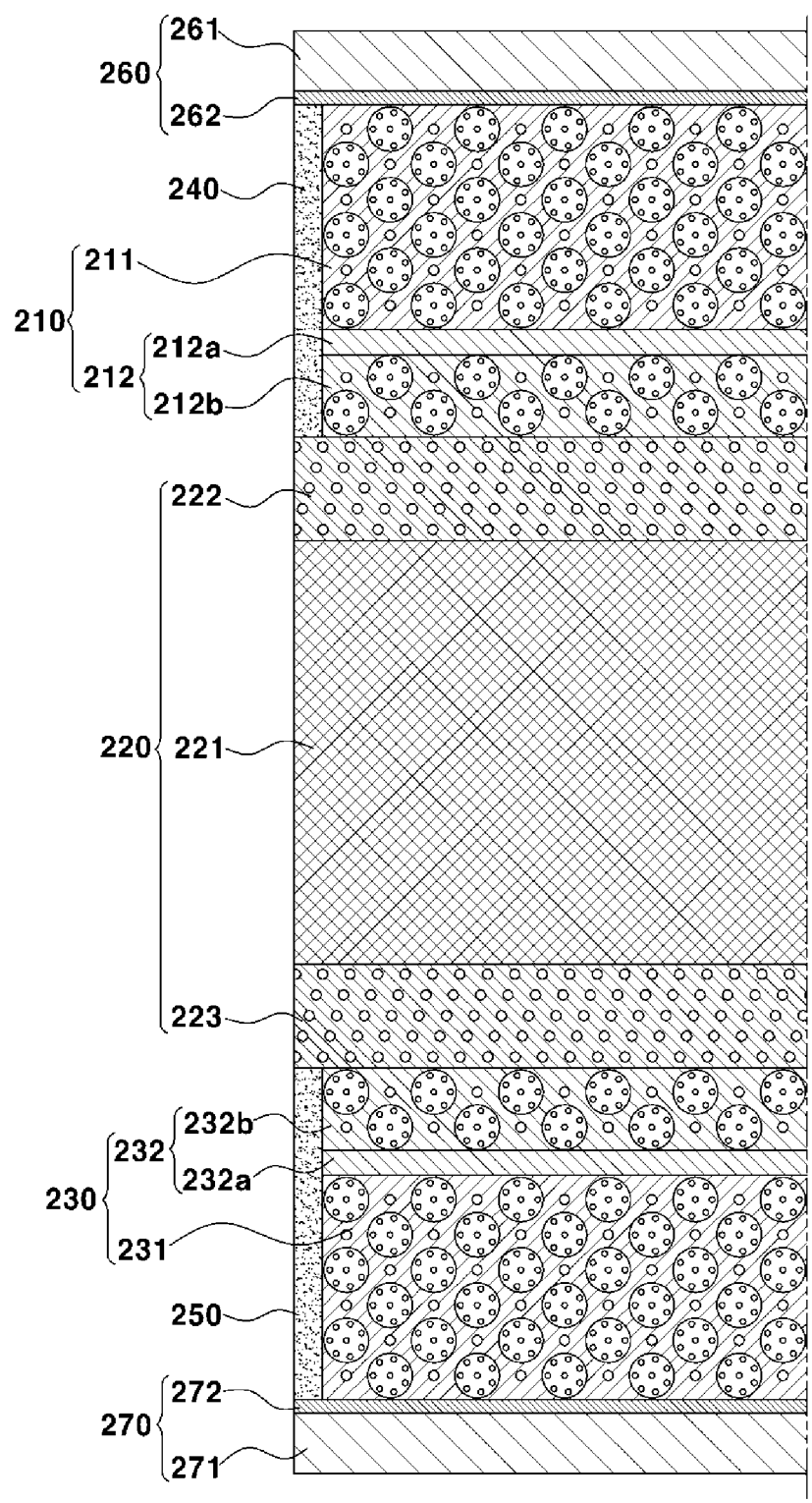
FIG. 4 is a partially enlarged cross-sectional view of the membrane electrode assembly for fuel cells manufactured in the example of the present disclosure.

FIG. 3 is a cross-sectional view of the membrane electrode assembly 200 for fuel cells manufactured in this example of the present disclosure. FIG. 4 is a partially enlarged cross-sectional view of the membrane electrode assembly 200 for fuel cells manufactured in the example of the present disclosure. Referring to FIGS. 3 and 4, the membrane electrode assembly 200 includes the electrolyte membrane 220, the cathode 210, the anode 230, sub-gaskets 240 and 250 and gas diffusion layers 260 and 270, as detailed elements. In more detail, the cathode 210 and the anode 230 are formed on both surfaces of the electrolyte membrane 220, and the cathode 210 and the anode 230 respectively include electrode layers 211 and 231 and protective layers 212 and 232. The side surfaces of the cathode 210 and the anode 230 are sealed with the first sub-gasket 240 and the second sub-gasket 250, respectively. The first and second sub-gaskets 240 and 250 and electrodes, i.e., the cathode 210 and the anode 230, are covered with the first gas diffusion layer 260 and the second gas diffusion layer 270.

As shown in FIGS. 3 and 4, the cathode 210, the anode 230 and the electrolyte membrane 220 includes the following elements. Platinum (Pt) was used as a metal catalyst 131, and porous carbon was used as a carbon support. The electrode layers 211 and 231 of the cathode 210 and the anode 230 include 18 wt % of a Pt/C catalyst support 132 in which the platinum catalyst 131 is supported on the carbon support, 5 wt % of an antioxidant 133 which is cerium oxide, and 50 wt % of an ionomer 134 which is formed of PFSA. The protective layers 212 and 232 of the cathode 210 and the anode 230 include ionomer layers 212a and 232a formed of PFSA, and catalyst layers 212b and 232b. The catalyst layers 212b and 232b include 5 wt % of the Pt/C catalyst support 132, 1 wt % of the antioxidant 133, and 94 wt % of an ionomer 135 which is PFSA. The electrolyte membrane 220 includes a first ion exchange layer 222 which is formed of PFSA and provided on one surface of a reinforcing layer 221 formed of e-PTFE, and a second ion exchange layer 223 which is formed of PFSA and provided on the other surface of the reinforcing layer 221.

COMPARATIVE EXAMPLE

A membrane electrode assembly 300 was manufactured through the same method as the example, but a cathode 310, an anode 330 and an electrolyte membrane 320 have different compositions from those of the membrane electrode assembly 200 of the example.

Figure 5:
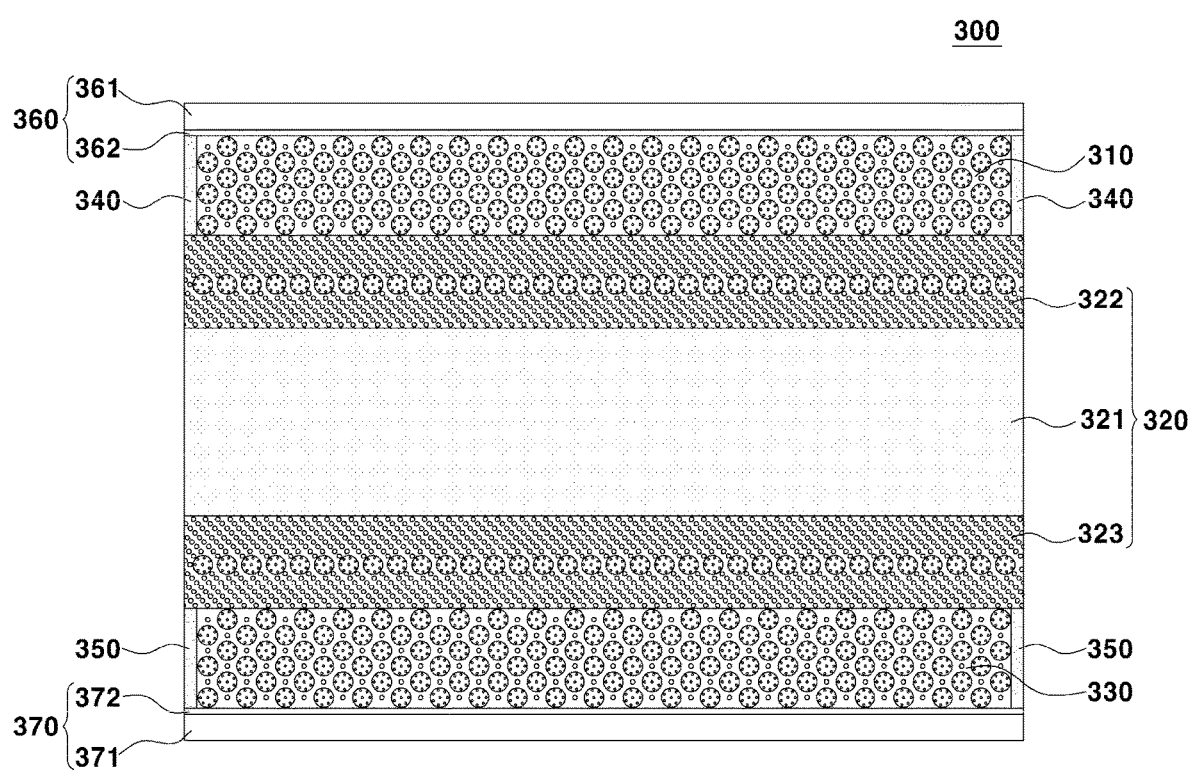
FIG. 5 is a cross-sectional view of a membrane electrode assembly for fuel cells manufactured in a comparative example of the present disclosure.
Figure 6:
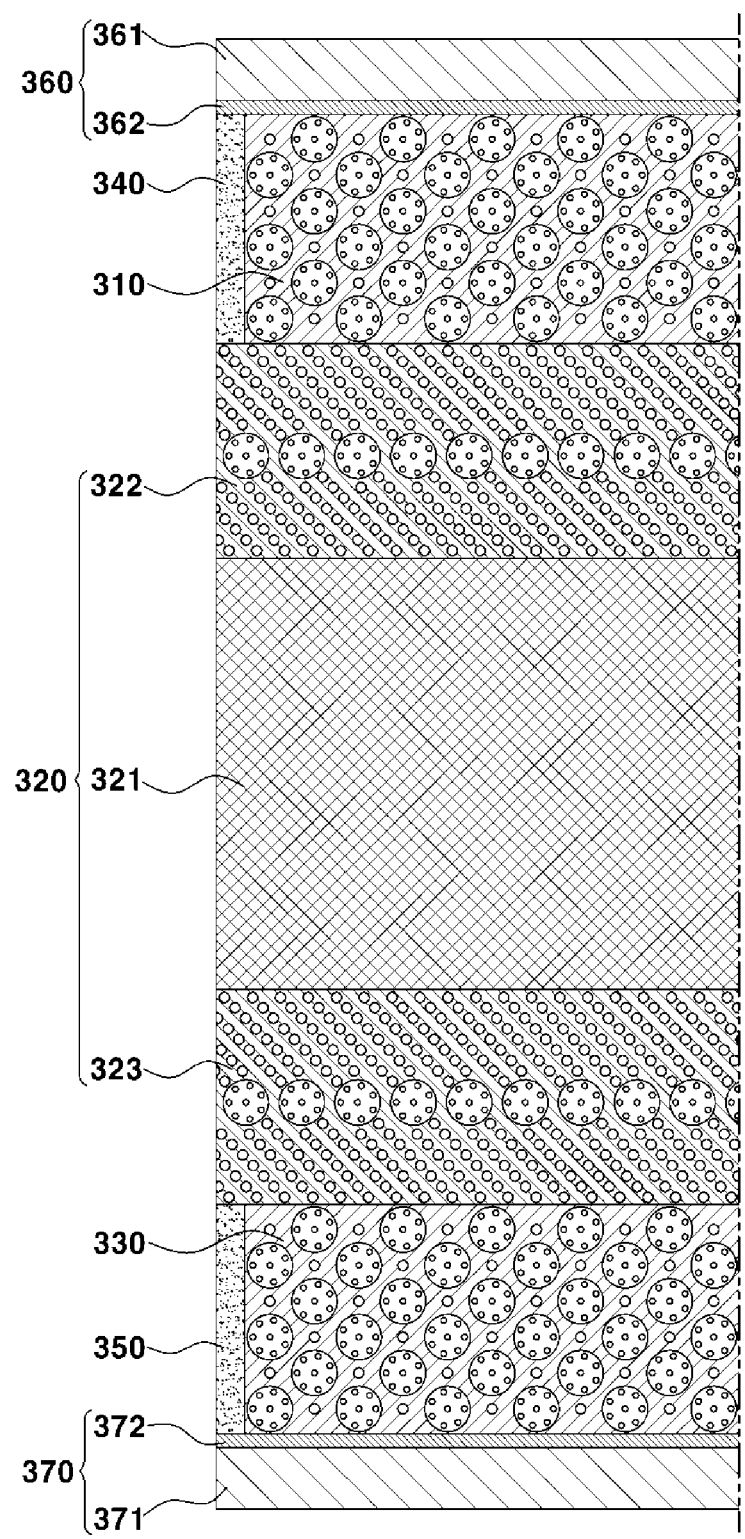
FIG. 6 is a partially enlarged cross-sectional view of the membrane electrode assembly for fuel cells manufactured in the comparative example of the present disclosure.

FIG. 5 is a cross-sectional view of the membrane electrode assembly 300 for fuel cells manufactured in this comparative example. FIG. 6 is a partially enlarged cross-sectional view of the membrane electrode assembly 300 for fuel cells manufactured in the comparative example. Referring to FIGS. 5 and 6, the membrane electrode assembly 300 is configured such that the cathode 310 and the anode 330 are formed on both surfaces of the electrolyte membrane 320. The cathode 310 and the anode 330 include 1-70 wt % of a Pt/C catalyst support in which a platinum catalyst is supported on a carbon support, 0.1-20 wt % of an antioxidant 133, and 10-98 wt % of an ionomer 134.

The electrolyte membrane 320 includes a reinforcing layer 321 formed of e-PTFE, a first ion exchange layer 322 provided on one surface of the reinforcing layer 321, and a second ion exchange layer 323 provided on the other surface of the reinforcing layer 321.

The side surfaces of the cathode 310 and the anode 330 are sealed with a first sub-gasket 340 and a second sub-gasket 350, respectively. The first and second sub-gaskets 340 and 350 and electrodes, i.e., the cathode 310 and the anode 330, are covered with a first gas diffusion layer 360 and a second gas diffusion layer 370.

Test Example 1

After charging and discharging of the membrane electrode assemblies 200 and 300 manufactured in the example and the comparative example were performed, cell voltages of the membrane electrode assemblies 200 and 300 according to current density were measured. Results of such measurement are illustrated in FIG. 7.

Figure 7:
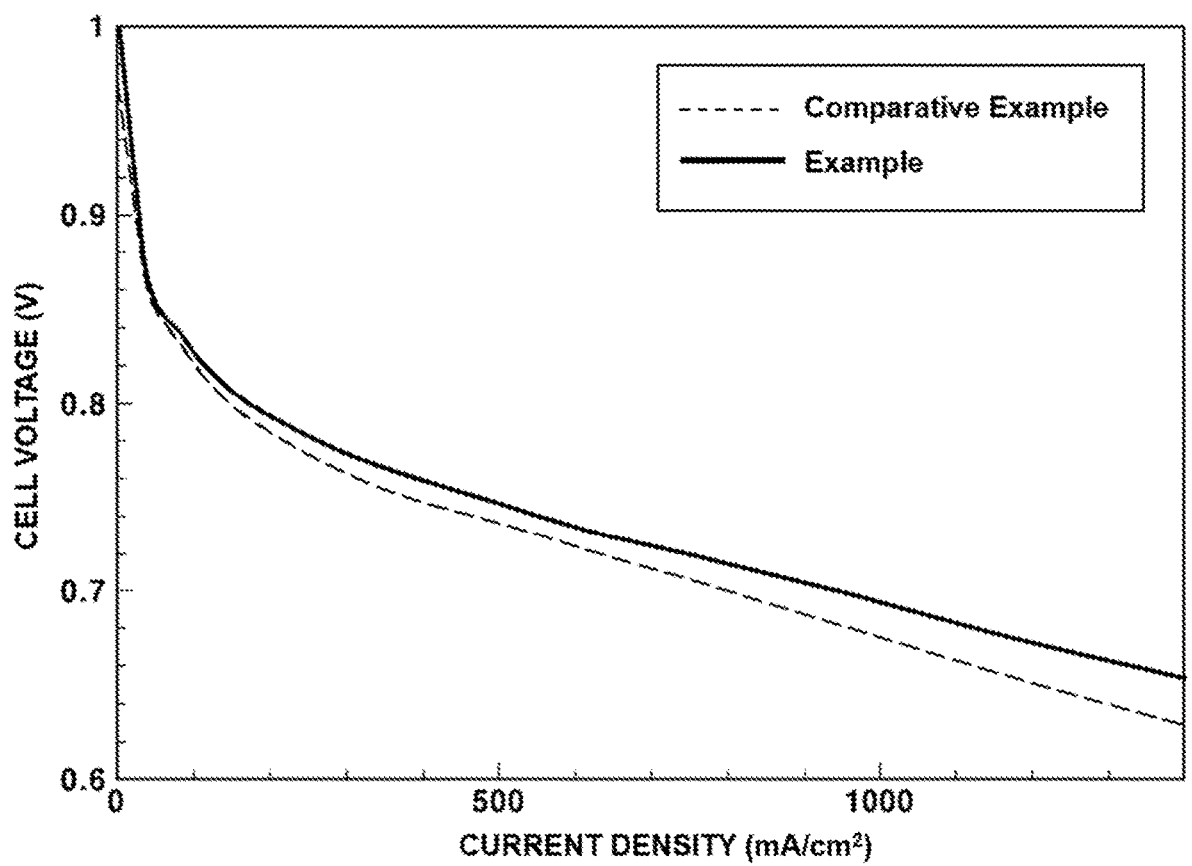
FIG. 7 is a graph representing cell voltages of the membrane electrode assemblies for fuel cells manufactured in the example and the comparative example of the present disclosure, according to current density.

FIG. 7 is a graph representing the cell voltages of the membrane electrode assemblies 200 and 300 for fuel cells manufactured in the example and the comparative example of the present disclosure, according to current density. Referring to FIG. 7, it was confirmed that the membrane electrode assembly 200 for fuel cells manufactured in the example maintains a higher cell voltage than the membrane electrode assembly 300 for fuel cells manufactured in the comparative example even if the current density is increased. Thereby, it was understood that durability of the electrolyte membrane and the electrodes of the membrane electrode assembly 200 for fuel cells is improved and thus performance of a fuel cell is improved.

Test Example 2

After charging and discharging of the membrane electrode assemblies 200 and 300 for fuel cells manufactured in the example and the comparative example were performed 30 times under conditions of a current of 0-2 A/cm² and a voltage of 0-1 V, open circuit voltages (OCVs) and cell voltages of the membrane electrode assemblies 200 and 300 for fuel cells according to discharging time were measured. Results of such measurement are illustrated in FIGS. 8 and 9.

Figure 8:
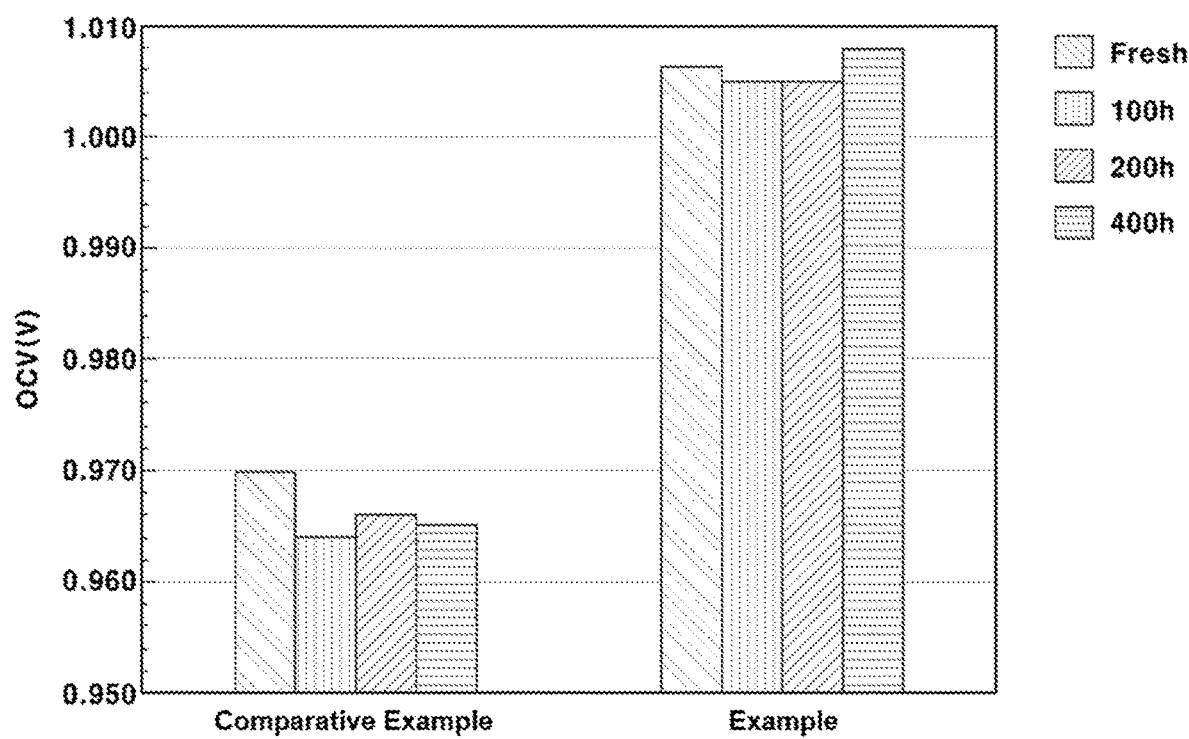
FIG. 8 is a graph representing open circuit voltages (OCVs) of the membrane electrode assemblies for fuel cells manufactured in the example and the comparative example of the present disclosure, according to discharging time.

FIG. 8 is a graph representing the open circuit voltages (OCVs) of the membrane electrode assemblies for fuel cells manufactured in the example and the comparative example of the present disclosure, according to discharging time. Referring to FIG. 8, it was confirmed that the membrane electrode assembly 200 for fuel cells manufactured in the example causes excellent reaction between permeated hydrogen gas and platinum in the catalyst layer, and thus has excellent open circuit voltage (OCV), as compared to the membrane electrode assembly 300 for fuel cells manufactured in the comparative example.

Figure 9:
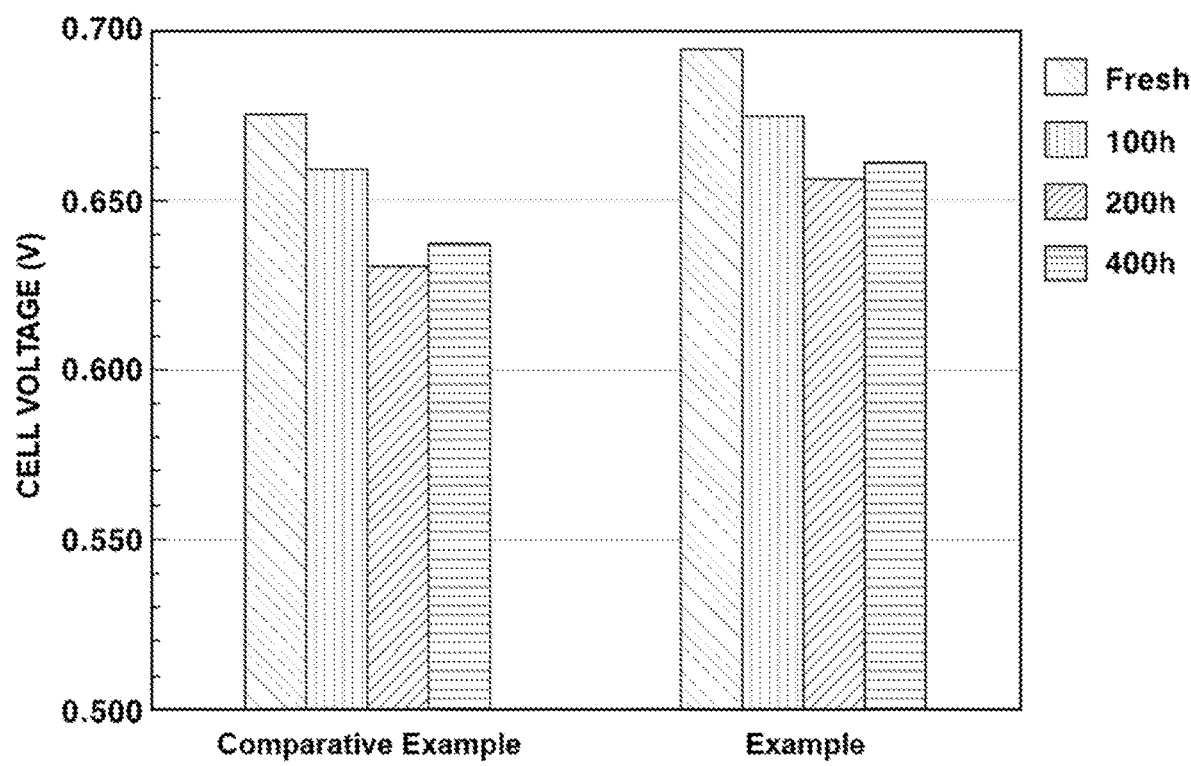
FIG. 9 is a graph representing cell voltages of the membrane electrode assemblies for fuel cells manufactured in the example and the comparative example of the present disclosure, according to discharging time.

FIG. 9 is a graph representing the cell voltages of the membrane electrode assemblies for fuel cells manufactured in the example and the comparative example of the present disclosure, according to discharging time. Referring to FIG. 9, it was confirmed that the membrane electrode assembly 200 for fuel cells manufactured in the example has an improved transferred state of the electrode layers, and thus forms the interfaces having excellent quality between the catalyst layers and the electrode layers and has an enhanced cell voltage, as compared to the membrane electrode assembly 300 for fuel cells manufactured in the comparative example.

As is apparent from the above description, an electrode for fuel cells in accordance with the present disclosure includes an ionomer layer which is structurally independent, between an electrode layer and a catalyst layer, thereby electrically completely isolating the catalyst layer and thus being capable of suppressing production of hydrogen peroxide in the catalyst layer.

Further, the electrode for fuel cells in accordance with the present disclosure allows the catalyst layer to include an antioxidant, and thereby, the antioxidant is chemically combined with radicals generated from hydrogen peroxide so as to remove the radicals, thus improving durability of the electrode for fuel cells.

In addition, a membrane electrode assembly for fuel cells in accordance with the present disclosure disperses some of a catalyst support and an antioxidant, which were included in an ion exchange layer of a conventional electrolyte membrane, into the catalyst layers of the electrodes, thereby improving interfacial bonding force between the electrodes and the electrolyte membrane and simultaneously improving durability of the electrolyte membrane.

In addition, a method for manufacturing a membrane electrode assembly for fuel cells in accordance with the present disclosure improves interfacial bonding force between electrodes and an electrolyte membrane, thus facilitating bonding of the electrodes to the electrolyte membrane using a transfer process.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. An electrode for fuel cells comprising:
an electrode layer; and
a protective layer formed at one side of the electrode layer,
wherein the electrode layer comprises a catalyst support in which a metal catalyst is supported on a carbon support, an antioxidant and an ionomer,
wherein the protective layer comprises:
an ionomer layer provided with one side contacting the electrode layer and comprising another ionomer; and
a catalyst layer formed at the other side of the ionomer layer and comprising the catalyst support in which the metal catalyst is supported on the carbon support, the antioxidant and the ionomer.

2. The electrode for fuel cells of claim 1, wherein the ionomer in the protective layer comprises a polymer comprising at least one sulfonated aromatic compound selected from the group consisting of perfluorosulfonic acid (PFSA), phenolsulfonic acid, polystyrene sulfonic acid, fluorinated styrene sulfonic acid and combinations thereof.

3. The electrode for fuel cells of claim 1, wherein the metal catalyst comprises one selected from the group consisting of platinum, gold, palladium, iridium, rhodium, ruthenium and combinations thereof.

4. The electrode for fuel cells of claim 1, wherein the carbon support comprises one selected from the group consisting of acetylene black, carbon black, porous carbon, carbon nanoparticles, carbon nanotubes, carbon nanofibers, graphene, graphite carbon and combinations thereof.

5. The electrode for fuel cells of claim 1, wherein the ionomer layer comprises the ionomer alone.

6. The electrode for fuel cells of claim 1, wherein:
a content of the catalyst support in the catalyst layer is less than a content of the catalyst support in the electrode layer; and
a content of the antioxidant in the catalyst layer is greater than a content of the antioxidant in the electrode layer.

7. The electrode for fuel cells of claim 1, wherein the electrode layer comprises 1-70 wt % of the catalyst support, 0.1-20 wt % of the antioxidant, and 10-98 wt % of the ionomer.

8. The electrode for fuel cells of claim 1, wherein the catalyst layer comprises 0.1-30 wt % of the catalyst support, 0.01-20 wt % of the antioxidant, and 50-99 wt % of the ionomer.

9. A membrane electrode assembly for fuel cells comprising:
an electrolyte membrane; and
a pair of electrodes provided on both surfaces of the electrolyte membrane,
wherein the electrodes comprise a cathode and an anode,
wherein at least one of the cathode or the anode is the electrode for fuel cells of claim 1, and the cathode and the anode are stacked on the electrolyte membrane such that protective layers of the cathode and the anode face the electrolyte membrane.

10. The membrane electrode assembly for fuel cells of claim 9, wherein the electrolyte membrane comprises a porous reinforcing layer, a first ion exchange layer provided on one surface of the reinforcing layer, and a second ion exchange layer provided on the other surface of the reinforcing layer.

11. The membrane electrode assembly for fuel cells of claim 9, further comprising:
a first sub-gasket configured to contact one surface of the electrolyte membrane and to contact side surfaces of the cathode; and a second sub-gasket configured to contact the other surface of the electrolyte membrane and to contact side surfaces of the anode.

12. The membrane electrode assembly for fuel cells of claim 11, further comprising:
 a first gas diffusion layer configured to contact the first sub-gasket and the cathode; and
 a second gas diffusion layer configured to contact the second sub-gasket and the anode.

* * * * *